July 5, 1938.　　　LE ROY S. PINKHAM　　　2,122,723
COMBINED FILM CRADLE AND DRYING RACK
Filed Dec. 10, 1936

Inventor
Le Roy S. Pinkham
By Clarence A. O'Brien
Hyman Berman
Attorneys

Patented July 5, 1938

2,122,723

UNITED STATES PATENT OFFICE 2,122,723

COMBINED FILM CRADLE AND DRYING RACK

Le Roy Samuel Pinkham, Santa Barbara, Calif.

Application December 10, 1936, Serial No. 115,236

2 Claims. (Cl. 95—100)

My invention relates generally to means for facilitating the handling of photographic films in the processing thereof, and particularly to an arrangement for holding dental X-ray films while processing the same, and for drying the same after processing, and an important object of the invention is to provide an arrangement of this type exhibiting compactness, practical indestructability, and economy of labor and material in the handling of films.

Another important object of my invention is to provide an arrangement of the character indicated above which saves time and effort ordinarily required to place and remove films from a rack, and which definitely obviates the damaging of films which is incidental to the use of clamps and certain types of racks used in developing tanks.

Other important objects of my invention will be apparent from a reading of the following description taken in connection with the drawing, wherein for purposes of illustration I have shown a preferred embodiment of my invention.

In the drawing:—

Figure 1:
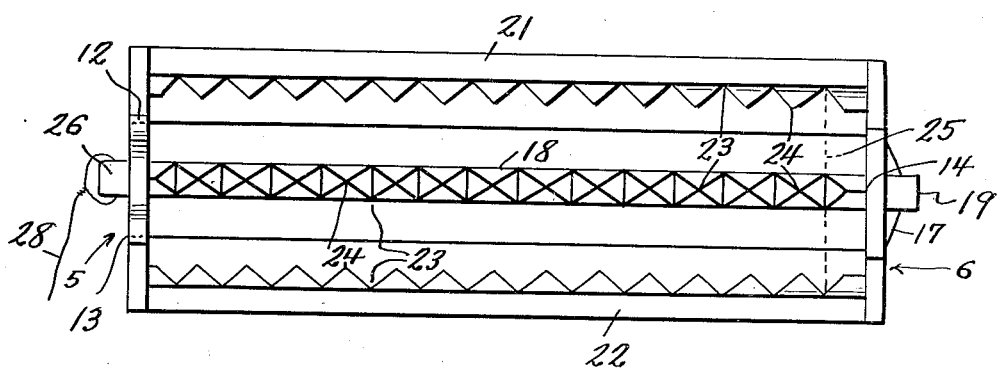
Figure 1 is a general top plan view of the embodiment.

Referring in detail to the drawing, the numerals 5 and 6 designate generally respective ends which are generally rectangular in form and are provided near their upper edges with half-moon hand receiving openings 8 and 9 and below these with cut out circles 10 and 11.

Figure 2:
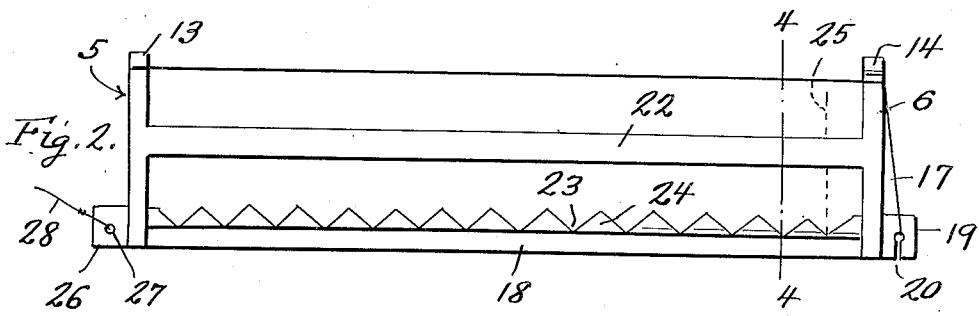
Figure 2 is a side elevational view thereof.
Figures 3, 4:
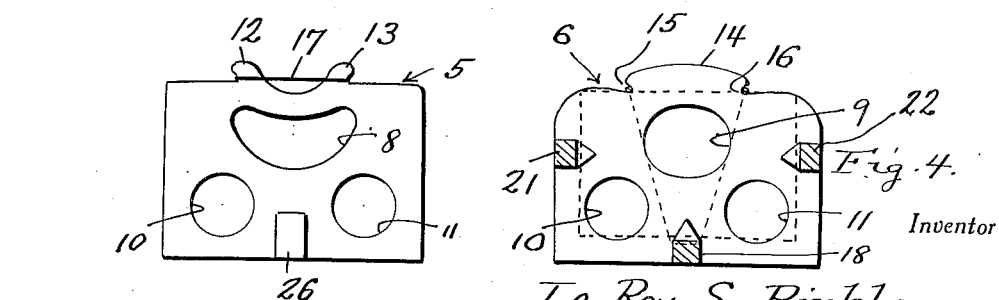
Figure 3 is an end elevational view.
Figure 4 is a transverse vertical sectional view taken through Figure 2 approximately on the line 4—4.

Above the hand openings 8 and 9 are, on the end 5, the oppositely directed fingers 12 and 13, and on the end 5 the ovalized vertical projection 14 which is undercut at its ends as indicated by the numerals 15 and 16; both the undercuts and the fingers 12 and 13 forming retainers for the rubber band 17 which is passed therearound and strung between the opposite ends in spaced manner as indicated in Figure 1 of the drawing, whereby the strands of the rubber band overhang and lie parallel with respect to the bottom longitudinal member 18. As shown in Figures 2 and 3 the end 6 is provided near its bottom edge with a longitudinal projection 19 which is slotted as indicated by the numeral 20 to receive the rubber band 17 in a properly stretched condition, so as to provide a relatively permanent installation of the rubber band in the manner indicated.

Opposite side longitudinal members are like the bottom longitudinal member 18 attached to the inner surfaces of the ends 5 and 6 in the relative positions indicated in Figures 1 and 4.

On the inward faces and running along the length of the longitudinal members are succeeding notches and projections 23 and 24, respectively, and these notches and projections are transversely aligned so as to engage these edges of a film 25 for supporting the same in a vertical position and spaced from its neighbors with the two strands of the rubber band 17 overlying and engaging the topmost edge of the film as indicated in Figure 2.

As clearly shown the projections are pyramidical in form although they may assume some other suitable form without departing from the invention.

The lower part of the outer side of the end 5 has a projection 26 which has a hole 27 therein to receive a string 28 utilized to handle the cradle or rack in the developing tank.

Although I have shown and described herein a preferred embodiment of my invention, it is to be definitely understood that I do not desire to limit the application of the invention thereto, and any change or changes may be made in the materials, and in the structure and arrangement of the parts, within the spirit of the invention and the scope of the subjoined claims.

What is claimed is:—

1. A combined film cradle and drying rack of the character described comprising a pair of opposed ends, opposite side and bottom longitudinal members extending between and attached at the side and bottom edges of the said ends and spacing the said ends, the facing surfaces of said side longitudinal members at the top surface of said bottom longitudinal member being formed with projections defining triangular notches for receiving the bottom and two side edges of the film.

2. A combined film cradle and drying rack of the character described comprising a pair of opposed ends, opposite side and bottom longitudinal members extending between and attached at the side and bottom edges of the said ends and spacing the said ends, the facing surfaces of said side longitudinal members at the top surface of said bottom longitudinal member being formed with projections defining triangular notches for receiving the bottom and two side edges of the film, and a flexible retainer strung between the tops of the said ends and for engaging the top edge of the film for releasably holding the same in place.

LE ROY SAMUEL PINKHAM.